(12) United States Patent
Sorensen

(10) Patent No.: US 12,740,556 B2
(45) Date of Patent: Sep. 22, 2026

(54) GATE MECHANISM

(71) Applicant: Peter Scott Sorensen, Blacksburg, VA (US)

(72) Inventor: Peter Scott Sorensen, Blacksburg, VA (US)

( * ) Notice: Subject to any disclaimer, the term of this patent is extended or adjusted under 35 U.S.C. 154(b) by 0 days.

(21) Appl. No.: 19/007,078

(22) Filed: Dec. 31, 2024

(65) Prior Publication Data

US 2026/0182560 A1 Jul. 2, 2026

(51) Int. Cl.
*A01M 23/08* (2006.01)
*A01M 23/14* (2006.01)
*A01M 23/18* (2006.01)

(52) U.S. Cl.
CPC ............ *A01M 23/08* (2013.01); *A01M 23/14* (2013.01); *A01M 23/18* (2013.01)

(58) Field of Classification Search
CPC ...... A01M 23/02; A01M 23/08; A01M 23/14; A01M 23/16; A01M 23/18; A01M 23/20; A01K 1/0017; A01K 1/0023; A01K 1/0029
USPC ...... 43/60, 61, 64–67, 73, 74; 119/510, 524, 119/731, 734–737, 840
See application file for complete search history.

(56) References Cited

U.S. PATENT DOCUMENTS 128,802 A * 7/1872 Lampkin .............. A01M 23/08 43/66
131,439 A * 9/1872 Harcourt et al. ..... A01M 21/00 43/65
147,899 A * 2/1874 Carnahan ............. A01M 23/08 43/66
644,386 A * 2/1900 Watts ................... A01M 23/08 43/100
703,130 A * 6/1902 Jacobs ................ A01K 1/0023 49/67
777,109 A * 12/1904 King .................... A01M 23/18 43/67
902,005 A * 10/1908 Shepherd ............. A01M 21/00 43/65
986,977 A * 3/1911 Harris .................. A01M 23/08 43/66

(Continued)

FOREIGN PATENT DOCUMENTS

AU 2021258042 A1 * 6/2022 ........... A01M 23/18
CN 102812943 A * 12/2012

(Continued)

*Primary Examiner* — Darren W Ark

(57) ABSTRACT

A gate mechanism for a live animal trap comprising a plurality of interlocking gates, including a first gate and a second gate. The first gate descends inwardly into the cage at an angle, preferably 35°, while the second gate hangs at least partially vertical. Each of the gates comprises a pattern of arms and cutouts, thereby allowing the gates to reside on intersecting planes. The gates possess a locking mechanism such that the locking mechanism inhibits an upward force applied to the first gate from the inside of the enclosure from opening the gate mechanism and thus allowing the animal to escape. The configuration of the gate mechanism relies on gravity and therefore the trap automatically resets as soon as an animal passes through the gate mechanism, enabling the gate mechanism to be used again without needing to be physically reset.

14 Claims, 10 Drawing Sheets

(56) References Cited

U.S. PATENT DOCUMENTS 1,010,256 A * 11/1911 Harris .................. A01M 23/08 43/66
1,139,501 A * 5/1915 Dennis ................. A01M 21/00 43/65
1,363,626 A * 12/1920 Thomas ............... A01M 23/20 43/66
1,515,083 A * 11/1924 Wilkins ............... A01M 23/08 43/61
1,515,559 A * 11/1924 Edwards .............. A01M 23/08 43/65
1,602,652 A * 10/1926 Creech ................. A01M 23/00 43/67
1,619,366 A * 3/1927 Petersen .............. A01M 23/00 43/100
1,702,329 A * 2/1929 Wirth ................... A01M 23/24 43/66
1,726,493 A * 8/1929 Kelley ................. A01M 23/04 43/67
1,911,919 A * 5/1933 Molls ................... A01M 23/18 43/66
2,119,828 A * 6/1938 Nordenstam .......... A01K 69/08 43/65
2,178,789 A * 11/1939 Heath .................. A01M 23/08 43/66
2,523,624 A * 9/1950 Honeycutt ............ A01M 23/18 43/76
2,693,050 A * 11/1954 Neid .................... A01M 23/18 217/57
2,787,082 A * 4/1957 Paschen ............... A01M 23/14 43/66
2,842,891 A * 7/1958 Neid .................... A01M 23/02 43/66
2,995,861 A * 8/1961 Osborn ................ A01M 23/18 43/66
3,348,331 A * 10/1967 Williams ............. A01M 23/08 43/67
3,393,468 A * 7/1968 Wood ................... A01M 23/08 43/66
3,678,612 A * 7/1972 Hendrickson .......... A01K 69/10 43/100
3,786,591 A * 1/1974 Morford ............... A01M 23/08 43/66
4,162,588 A * 7/1979 Wyant .................. A01M 23/02 43/61
4,266,362 A * 5/1981 Campbell ............. A01M 23/08 43/66
4,418,493 A * 12/1983 Jordan ................. A01M 23/18 43/67
4,567,688 A * 2/1986 McKee ................. A01M 23/18 43/61
4,583,316 A * 4/1986 Holtgrefe .............. A01M 23/18 43/61
4,779,373 A * 10/1988 Krenson ................ A01K 31/24 43/61
4,782,620 A * 11/1988 Syszczyk .............. A01M 23/18 43/61
4,905,405 A * 3/1990 Hendricks .............. A01K 69/08 43/100
5,329,723 A * 7/1994 Liul ...................... A01M 23/18 43/61
5,386,663 A * 2/1995 Fields ................... A01M 23/18 43/66
5,410,837 A * 5/1995 Kazzyk ................. A01M 23/08 43/66
5,862,624 A * 1/1999 Askins .................. A01M 23/20 43/60
5,974,725 A * 11/1999 Knight ................... A01K 69/06 43/66
5,979,105 A * 11/1999 Marks ................... A01M 23/18 43/87
6,035,575 A * 3/2000 Hilty ...................... A01K 69/06 43/100
7,866,086 B2 * 1/2011 Murchison ............ A01M 23/08 43/61
7,913,448 B2 * 3/2011 December ............. A01K 69/06 43/100
8,407,931 B1 * 4/2013 Humphrey ............ A01M 23/18 43/67
10,426,148 B2 * 10/2019 Nguyen ................ A01M 23/18
11,819,017 B2 * 11/2023 Gauker ................. A01M 23/18
12,245,581 B2 * 3/2025 Kennamer ............ A01M 23/08
2002/0066222 A1 * 6/2002 Gehret .................. A01M 23/04 43/61
2006/0254122 A1 * 11/2006 Murchison ............ A01M 23/08 43/61
2007/0261292 A1 * 11/2007 December ............. A01K 69/06 43/66
2010/0275504 A1 * 11/2010 Hilty ...................... A01K 69/06 43/65
2012/0117853 A1 * 5/2012 Studer ................... A01M 23/08 43/67
2014/0352199 A1 * 12/2014 Matney ................. A01M 23/04 43/61
2015/0245603 A1 * 9/2015 Marks ................... A01M 23/18 43/61
2015/0351378 A1 * 12/2015 Zero ..................... A01M 23/08 43/62
2016/0135444 A1 * 5/2016 Pomerantz ............ A01M 23/18 43/61
2017/0367319 A1 * 12/2017 Marks ................... A01M 23/18
2020/0344995 A1 * 11/2020 Gauker ................. A01M 23/18
2023/0337654 A1 * 10/2023 Kennamer ............ A01M 23/08
2025/0275527 A1 * 9/2025 Kennamer ............ A01M 23/20

FOREIGN PATENT DOCUMENTS

CN 203646379 U * 6/2014
CN 104938468 A * 9/2015
CN 205455596 U * 8/2016
CN 207100296 U * 8/2016
CN 207626428 U * 7/2018
CN 207820932 U * 9/2018
CN 207820933 U * 9/2018
CN 214482977 U * 10/2021
CN 219373611 U * 7/2023
DE 9307812 U1 * 9/1993
FR 946234 A * 5/1949
JP 3164897 U * 12/2010
JP 3188488 U * 1/2014
JP 2016093139 A * 5/2016
JP 2016208906 A * 12/2016
JP 2025065970 A * 4/2025
KR 20100121565 A * 11/2010 ............ A01M 23/08
KR 20220010149 A 1/2022
KR 102400443 B1 * 5/2022 ............ A01M 23/02
WO WO-2004030451 A2 * 4/2004 ............ A01M 23/30
WO WO-2006010279 A1 * 2/2006 .......... A01M 31/002
WO WO-2020263231 A1 * 12/2020 ............... E02B 7/28

* cited by examiner

GATE MECHANISM

FIELD OF THE INVENTION

The present invention relates generally to a gate mechanism. More specifically, the present invention is an unidirectional gate system for animal traps.

BACKGROUND OF THE INVENTION

The use of live animal traps has long been a critical tool for wildlife management, pest control, and research. Such traps must balance effective capture with the humane treatment of the animal. A key component of these traps is the gate mechanism, which serves as the primary means to retain the animal within the enclosure once it has entered. The effectiveness of the gate mechanism is central to the overall functionality of the trap, as an improperly secured gate may allow the animal to escape or cause unnecessary stress or injury.

Traditionally, live animal traps employ various types of gate mechanisms, including one-way doors, drop gates, and spring-loaded panels. One-way doors often utilize a single gate that swings inward to allow entry but is prevented from opening outward due to a stop or locking mechanism. While effective in many cases, these systems are not without limitations. Animals with sufficient strength or dexterity can sometimes lift or push the gate open from inside the trap, leading to unintended escape. Additionally, these systems often rely on intricate latches or locks, which may become unreliable over time due to wear, environmental exposure, or debris interference.

Drop gate systems typically use a weighted or spring-loaded gate that falls into place once the animal has entered the trap. These designs can be effective in ensuring retention but may have drawbacks in terms of mechanical complexity, weight, and the potential for malfunction if the trigger mechanism fails. Moreover, these systems often do not provide a means of securing the gate against upward force, which can still allow escape if an animal is able to exert sufficient leverage.

Spring-loaded panels and similar designs incorporate mechanical resistance to prevent gate movement. However, these systems frequently require precise calibration and maintenance to ensure reliable operation. Furthermore, many spring-loaded designs are not suitable for traps intended for larger or stronger animals, as the resistance provided by the spring may be insufficient to counteract the force exerted by the animal.

The prior art also includes two-gate systems, wherein the animal must pass through a secondary barrier after traversing the first. While this design can enhance security, traditional two-gate systems often suffer from alignment issues or mechanical complexity. Additionally, many such systems are not designed to prevent animals from lifting the gates from within, making them vulnerable to escape attempts by more determined or intelligent animals.

Given these limitations, there exists a need for an improved gate mechanism that enhances the reliability and security of live animal traps while addressing the shortcomings of the prior art. Specifically, a mechanism is required that effectively prevents an entrapped animal from lifting the gate from the inside or manipulating it to escape, while also being simple, durable, and resistant to environmental degradation.

The present invention addresses these challenges by providing a novel two-gate system designed to ensure secure containment of at least one animal. Unlike the prior art, the present invention possesses a self-setting mechanism thereby allowing the gate mechanism to automatically reset after one animal passes through, thus allowing multiple animals to be entrapped. The gate mechanism comprises a first gate and a second gate, each constructed with multiple interlocking arms or prongs that scissor together to create a secure barrier. The gates are configured to open only upon an inward force applied to the frontmost gate, ensuring that entry into the trap is straightforward but exit is effectively blocked by a locking mechanism. Once the animal has passed through the first gate and the second gate, gravity closes the gate mechanism, and engages the locking mechanism, thereby providing a simple, one-way gate mechanism that prevents animals from lifting the gate from the inside.

A key feature of the present invention is its ability to counteract an upward force applied from within the trap, or in other words, a pulling force from within the trap. The interlocking design of the gate arms and a mechanical locking mechanism prevents the animal from lifting the gates or manipulating them in a way that would compromise their functionality. This makes the present invention particularly effective for use with animals that are known for their strength or persistence in escape attempts. Moreover, the simplicity of the scissoring design reduces the likelihood of mechanical failure, ensuring reliable operation over extended periods and in various environmental conditions.

By addressing the limitations of existing gate mechanisms and incorporating features designed to enhance security and durability, the present invention provides a significant advancement in the field of live animal traps. Its robust and innovative design ensures effective containment, reduces the risk of escape, and promotes the humane treatment of captured animals.

DETAIL DESCRIPTIONS OF THE INVENTION

Figure 1:
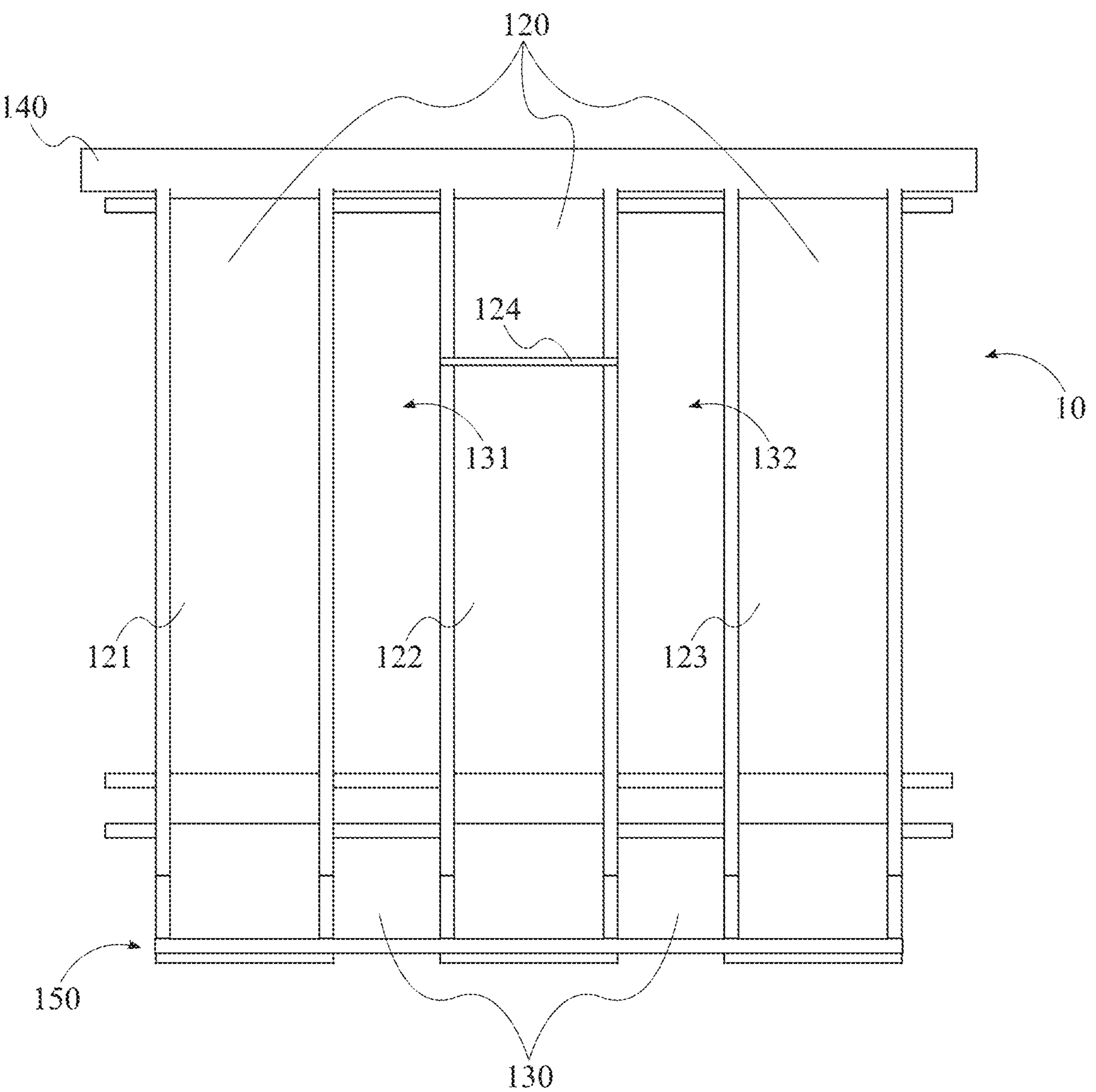
FIG. 1 is a rear view of the first gate of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and rality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

The present disclosure includes many aspects and features. Moreover, while many aspects and features relate to, and are described in the context of a gate mechanism 1, embodiments of the present disclosure are not limited to use only in this context.

Figure 2:
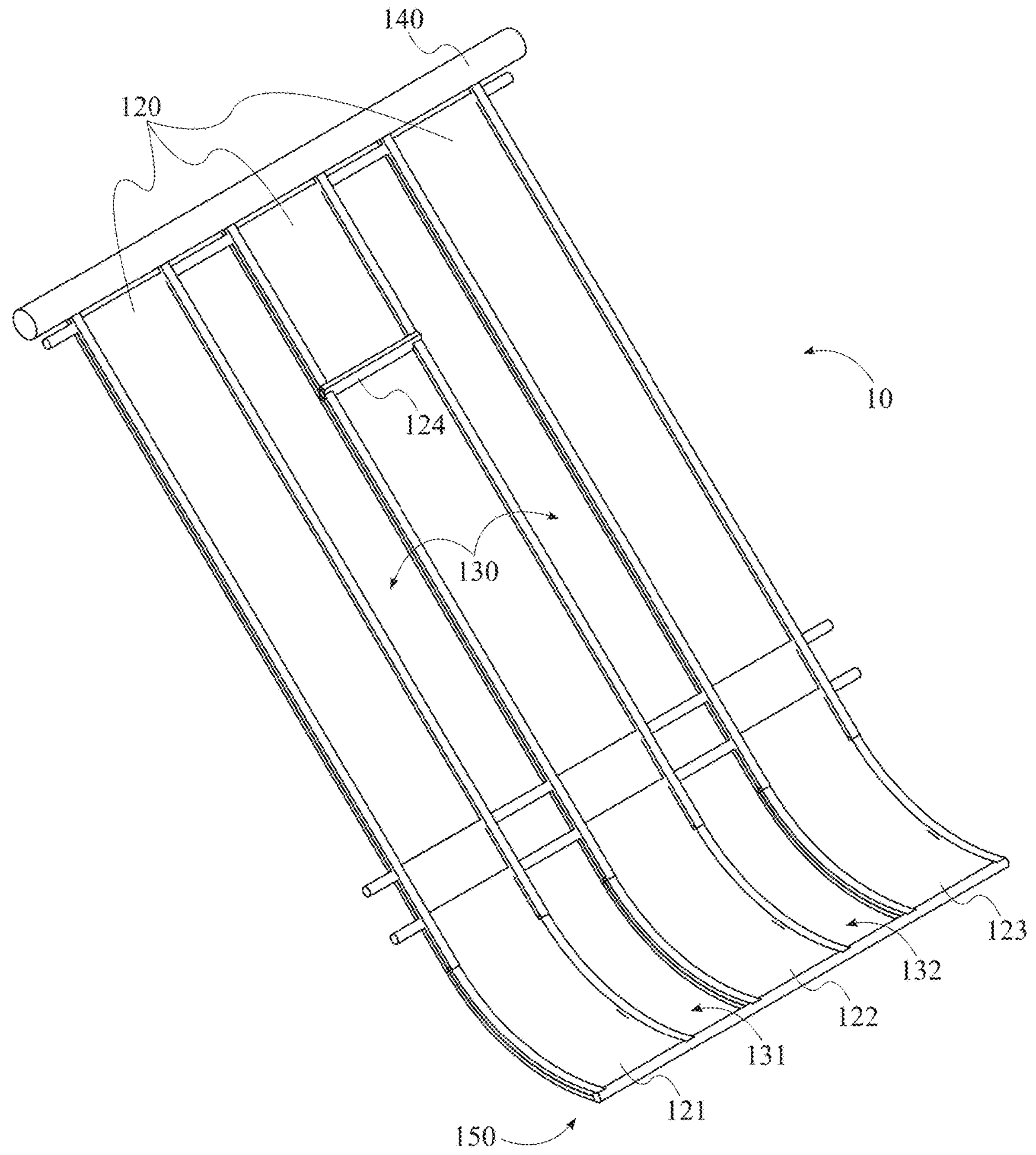
FIG. 2 is a perspective view of the first gate of the present invention.
Figure 3:
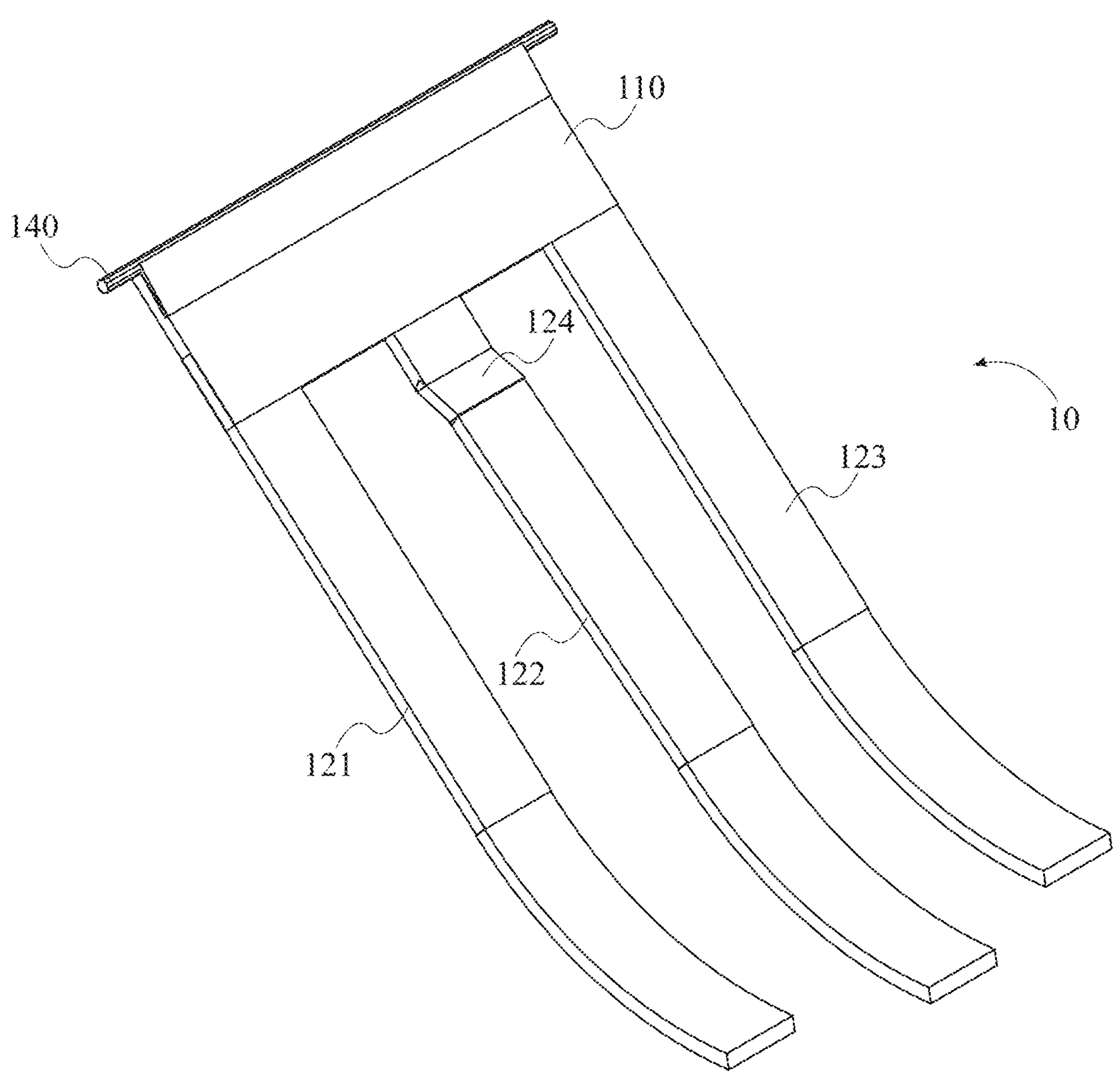
FIG. 3 is a perspective view of an alternate embodiment of the first gate of the present invention.
Figure 6:
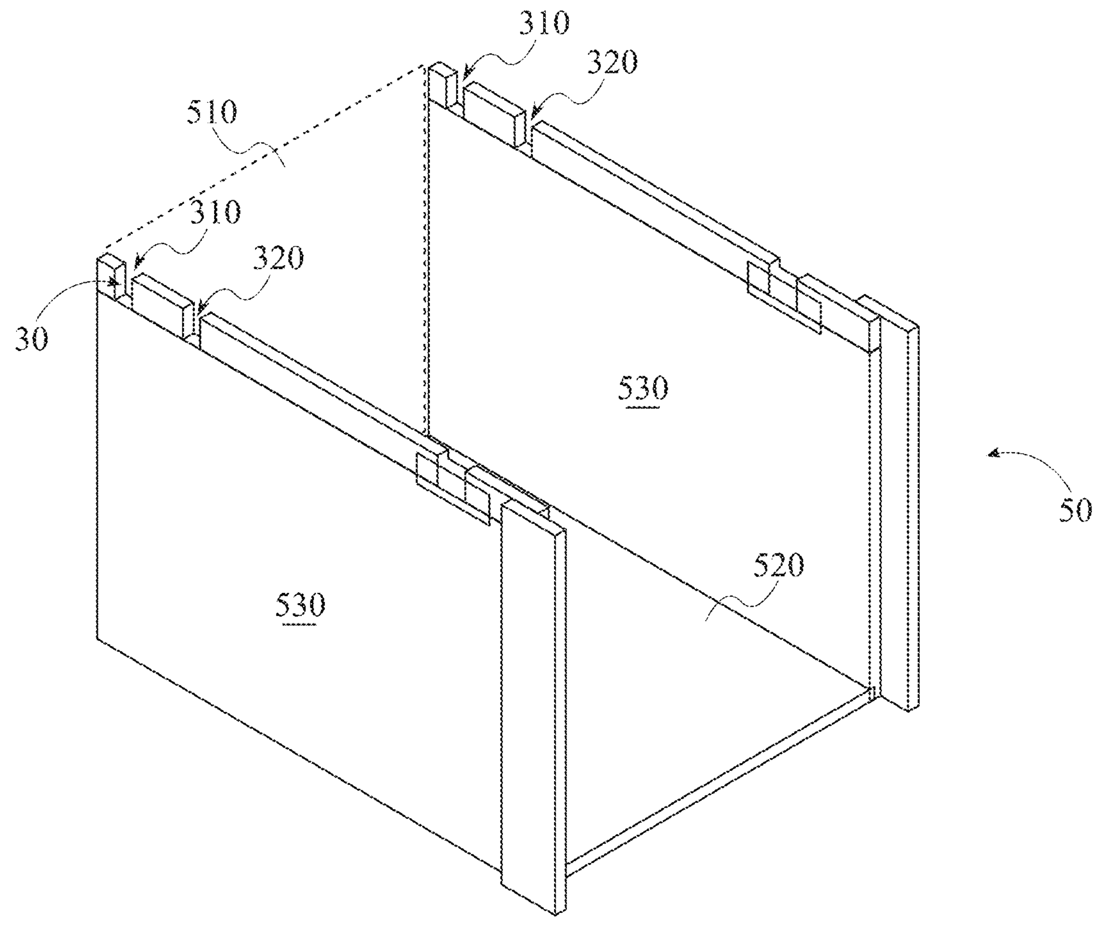
FIG. 6 is a perspective view of the housing of the present invention.
Figure 7:
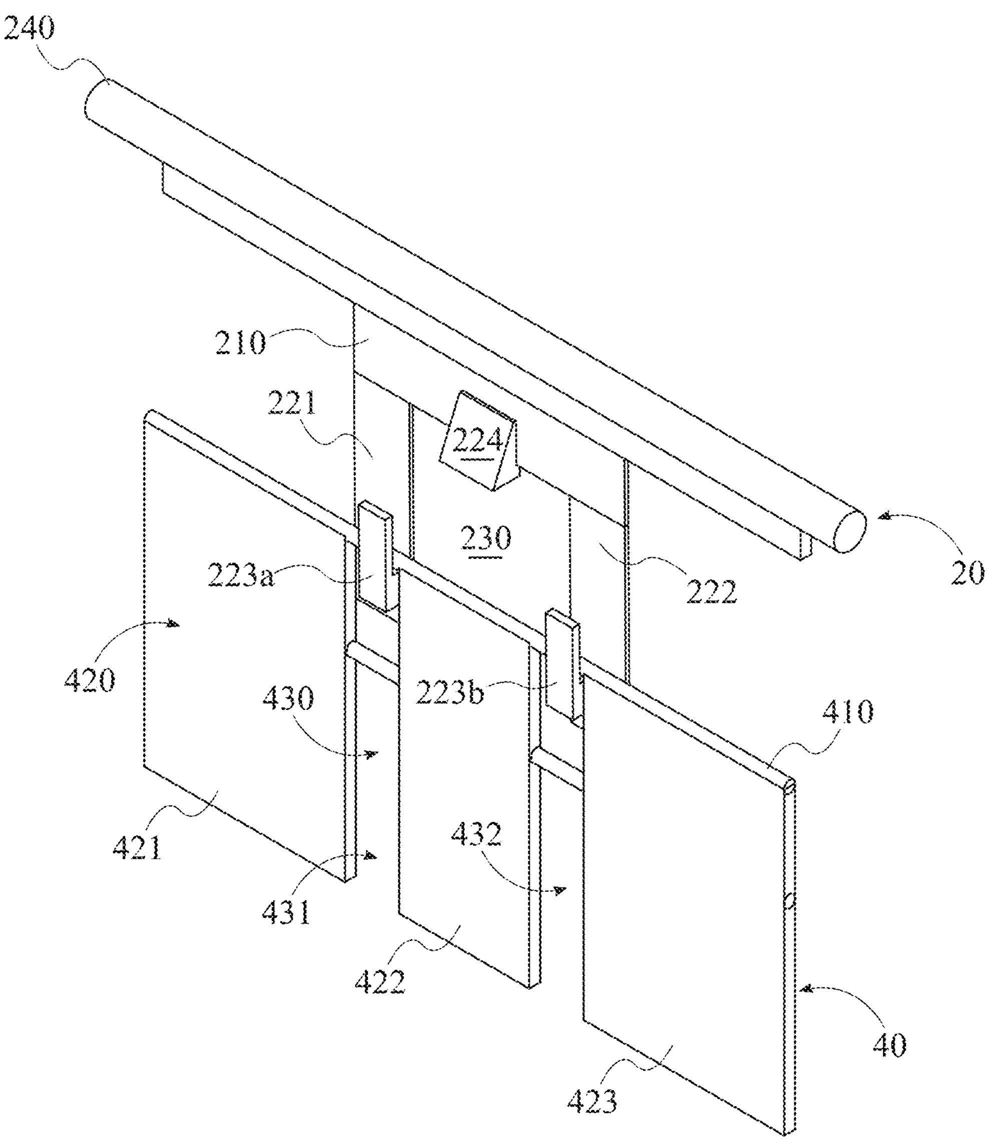
FIG. 7 is a perspective view of the second gate and the third gate of the present invention.
Figure 8:
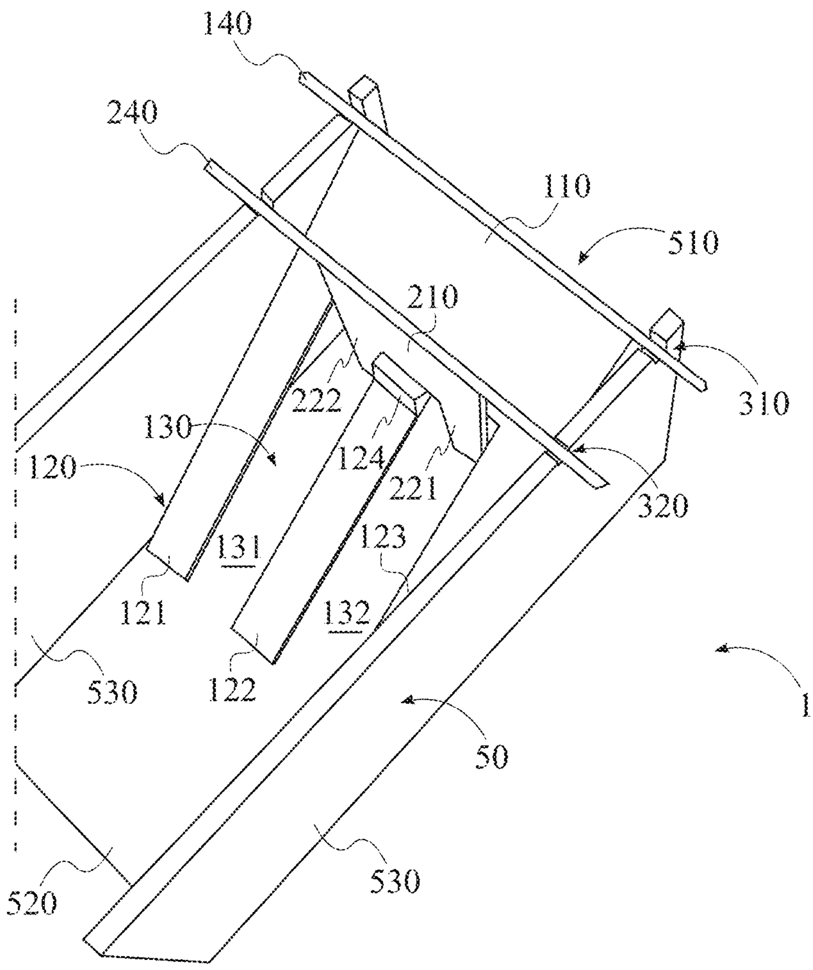
FIG. 8 is a perspective view of the present invention in the closed configuration.
Figure 9:
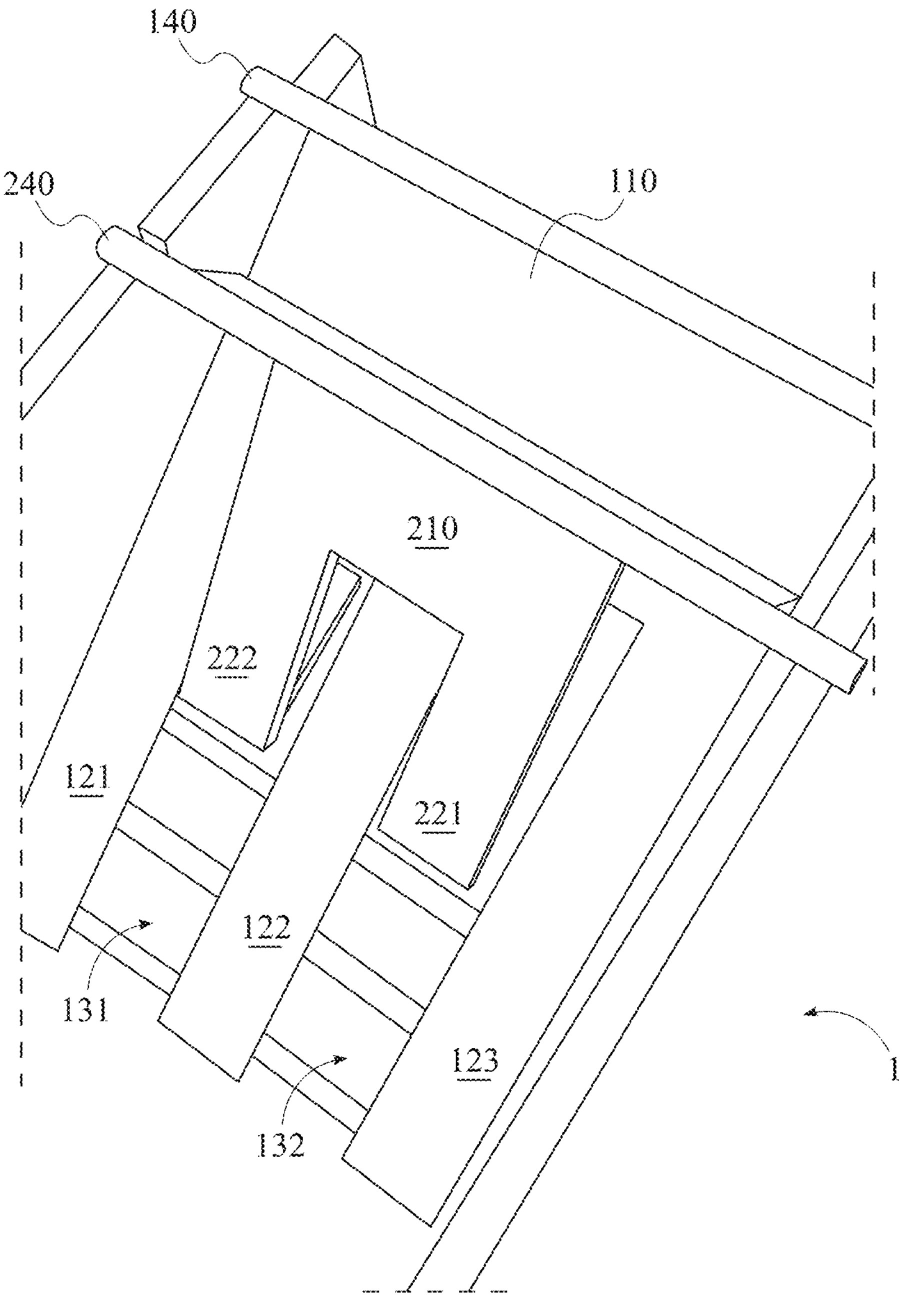
FIG. 9 is a perspective view of the present invention in the disengaged configuration.

As shown in FIGS. 1-10, the present invention is a gate mechanism 1 comprising a first gate 10 and a second gate 20. In the context of the present invention, the first gate 10 and the second gate 20 are interlockingly engaged with each other. As shown in FIGS. 1, 2, and 3, the first gate 10 comprises a plurality of arms 120, a plurality of cutouts 130, and a pivot pin 140. In the context of the present invention, the pivot pin 140 is an axel by which the first gate 10 hingedly rotates. Furthermore, in the context of the present invention, the plurality of arms 120 extend from the pivot pin 140. Additionally, in the context of the present invention, the plurality of cutouts 130 are interposed between each of the arms of the plurality of arms 120. In the preferred embodiment of the present invention, the plurality of arms 120 comprises a first arm 121, a second arm 122, and a third arm 123; and the plurality of cutouts 130 comprises a first cutout 131 and a second cutout 132; wherein the first cutout 131 is interposed between the first arm 121 and the second arm 122; and the second cutout 132 is interposed between the second arm 122 and the third arm 123. Furthermore, in some embodiments of the present invention, the first gate 10 comprises a distal end 150 wherein said distal end 150 is an opposing end from the pivot pin 140, by way of the plurality of arms 120. In the preferred embodiment of the present invention, the second arm 122 comprises a stopping mechanism 124, wherein said stopping mechanism 124 is a ridge, protrusion, a lip, or a contour of the like. In some embodiments of the present invention (as shown in FIG. 8-9) the first gate 10 comprises a body 110, wherein said body 110 is interposed between the pivot pin 140 and the plurality of the arms 120, such that the plurality of arms 120 extends from the body 110. In some embodiments of the present invention, the distal end 150 comprises a curvature, as shown in FIGS. 2 and 3.

Figure 4:
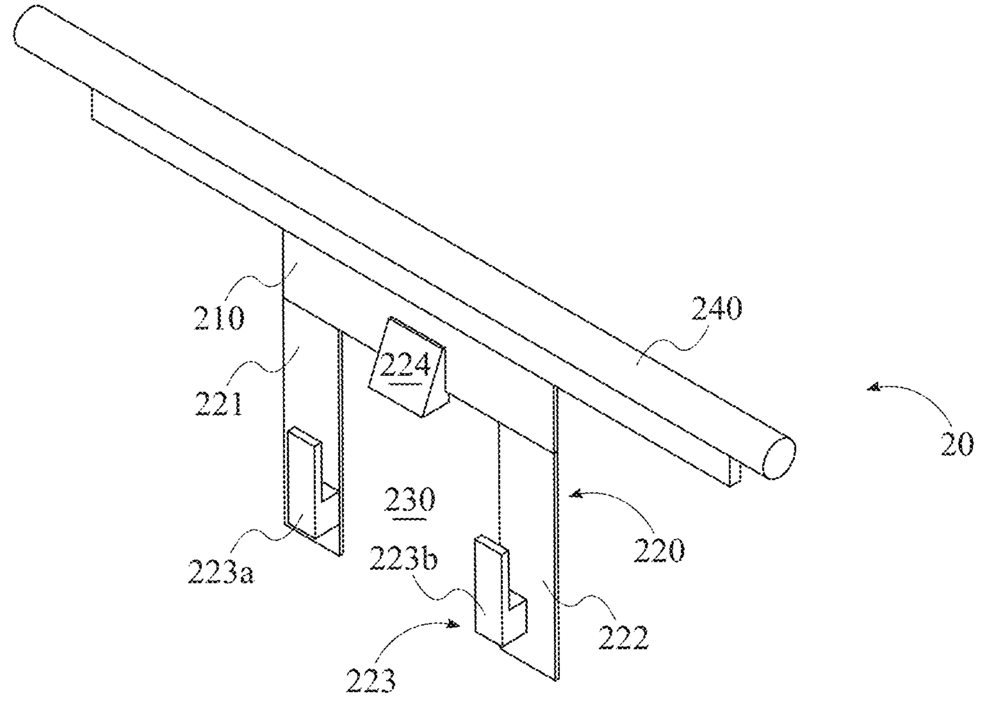
FIG. 4 is a perspective view of one embodiment of the second gate of the present invention.
Figure 5:
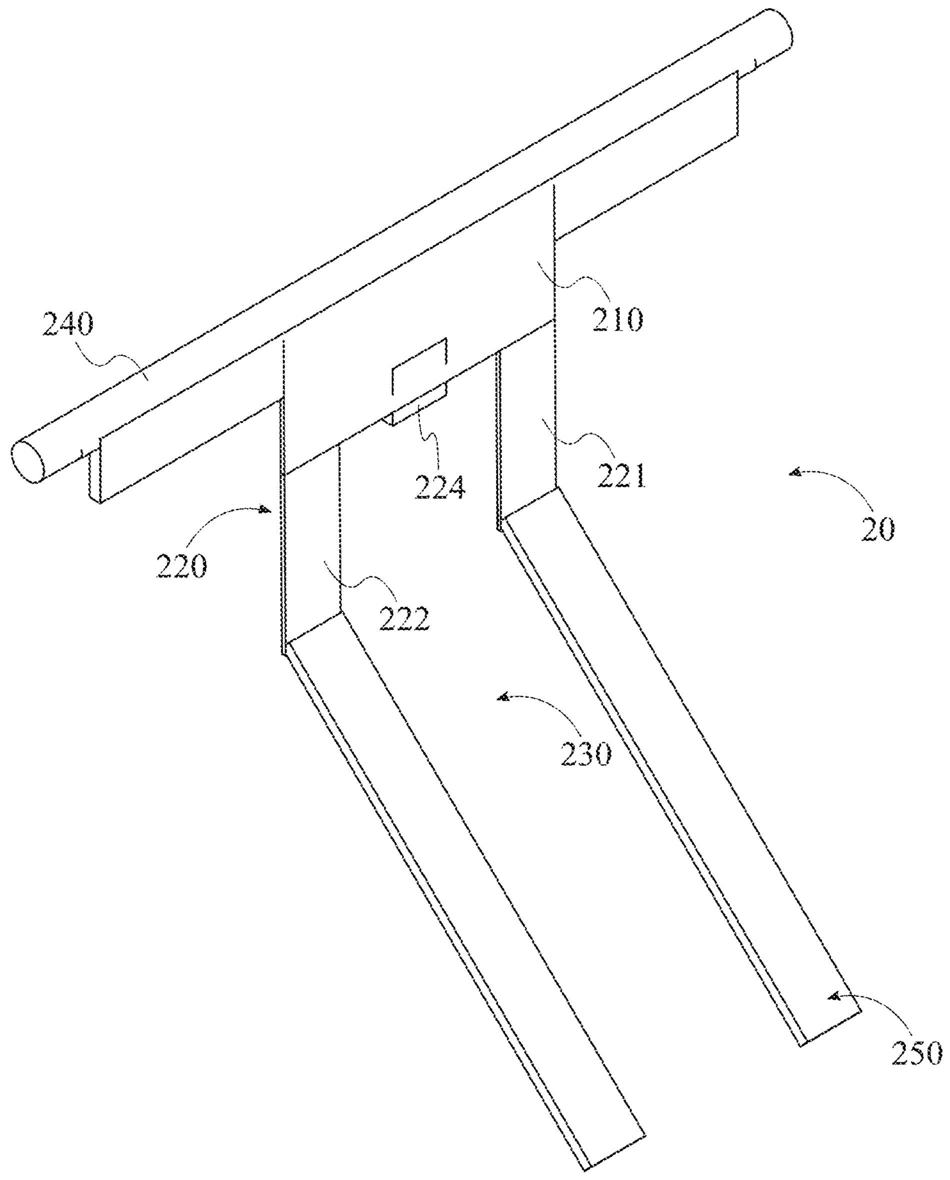
FIG. 5 is a perspective view of an alternate embodiment of the second gate of the present invention.

Referring to FIGS. 4 and 5, in the preferred embodiment of the present invention, the second gate 20 comprises a pivot pin 240, a plurality of arms 220 and a cutout 230. In the context of the present invention, the pivot pin 240 of the second gate 20 is an axel by which the second gate 20 hingedly rotates. In the preferred embodiment of the present invention, the plurality of arms 220 comprises a first arm 221 and a second arm 222 wherein the plurality of arms 220 extends from the pivot pin 240; and the cutout 230 is interposed between the first arm 221 and the second arm 222.

As shown in FIG. 4, in some embodiments of the present invention, the plurality of arms 220 of the second gate 20 comprise a plurality of hooks 223,**223*a*,223*b*, wherein one hook is coupled to each of the arms. In the context of the present invention, the plurality of hooks 223 of the present invention are hinge mechanisms by which a third gate 40 hingedly engages with the second gate 20. Furthermore, in some embodiments of the present invention, the second gate 20 comprises a body 210 wherein said body 210 of the second gate 20 is interposed between the pivot pin 240 and the plurality of the arms 220, such that the plurality of arms 220 extend from the body 240. Additionally, in the context of the body 210 of the second gate 20, in some embodiments of the present invention, the second gate 20 comprises a stopping mechanism 224 adjacent to the cutout 230 of the second gate 20, wherein the stopping mechanism 224 is located on the body 210. In some embodiments of the present invention, the second gate 20 further comprises a plurality of diagonally extended portions 250, as shown in FIG. 5, wherein each diagonally extended portion extends 250 from each arm of the plurality of arms 220 of the second gate 20. In the context of the present invention, the plurality of diagonally extended portions 250 are intended to give an animal a sense of security when entering through the gate mechanism 1. Through experimentation, the diagonally extended portions 250 have been found to provide results bearing a higher rate of success when compared to versions of the gate mechanism 1 without the diagonally extended portions 250, as such diagonal extended portions 250 have been found to provide a sense of security to the animal prior to entering the gate mechanism 1** and respective trap.

Furthermore, in the preferred embodiment of the present invention, the gate mechanism 1 further comprises a plurality of pivot joints 30, as shown in FIG. 6, wherein said pivot joints 30 constrain vertical and horizontal motion of the pivot pins of the first gate 10 and second gate 20, such that the first gate 10 and the second gate 20 are each confined to strictly hinged movement. More specifically, the pivot joints 30 confine motion of the first gate 10 and second gate 20 to only that of rotational motion around each respective pivot pin 140,240. With that, it must be noted that during assembly, disassembly, and construction of the gate mechanism 1 disclosed herein, the pivot joints 250 may be removed, thus allowing deconstruction and disassembly of the gate mechanism 1 and therefore vertical and horizontal motion of the gates 10,20, however, in the assembled configuration and the in-use configuration, each of the gates 10,20, through the constraints of the pivot joints 30, are only confined to hinged movement about the pivot pins 140,240. In the preferred embodiment of the present invention, the plurality of pivot joints 30 comprises a first pair of pivot joints 310 and a second pair of pivot joints 320 wherein the first gate 10 hinges within the first pair of pivot joints 310 and the second gate 20 hinges within the second pair of pivot joints 320. In some embodiments of the present invention, the vertical motion constraint may be provided by a lid or a roof, such that the prevents the lid or roof prevents the gates 10,20 from lifting. Additionally, in some embodiments of the present invention, the horizontal motion constraint may be provided by a notch thus preventing the pivot pins 140,240 to move horizontally.

Additionally, as shown in FIG. 6, the gate mechanism 1, in some embodiments, further comprises a housing 50. In the context of the present invention, the housing is a member such as a corridor or a cage, comprising the plurality of pivot joints 30. Furthermore, the housing comprises an entry-way 510, a floor 520, and a plurality of lateral walls 530. In the context of the present invention, the entry-way 510 is the front-most plane of the housing 50 wherein an animal enters the gate mechanism 1. Furthermore, the floor 520, within the context of the present invention is the bottom-most plane of the present invention. Additionally, in the preferred embodiment of the present invention, the plurality of lateral walls 530 contain the pivot joints 30 of the present invention.

In the context of the present invention, entry through the gate mechanism 1 is limited from an outward/exterior area, through the gate mechanism 1, and into an interior/inward area. Furthermore, using the gate mechanism 1 as a barrier within the context of the present invention, the frontmost portion of the gate constitutes the outwardly direction and the rearward portion of the gate mechanism 1 constitutes the inward direction. Thus, for example, an "inward force" is to be understood as a front-to-rearward force. Contrarily, an "outward force" is to be understood as a rear-to-frontward force.

In some embodiments of the present invention, to provide an additional sense of security to an animal entering the gate mechanism 1, said gate mechanism 1 may further comprise a third gate 40, as shown in FIG. 7. In the preferred embodiment of the present invention, the third gate 40 hingedly couples to the plurality of hooks 223 of the second gate 20. In the preferred embodiment of the present invention, the third gate 40 comprises a pivot pin 410, a plurality of arms 420, and a plurality of cutouts 430. In the context of the present invention, the plurality of arms 420 extends from the pivot pin 410, whereby one cutout from the plurality of cutouts 430 is interposed between each of the adjacent arms. In the preferred embodiment of the present invention, the plurality of arms 420 comprises a first arm 421, a second arm 422, and a third arm 423; the plurality of cutouts 430 comprises a first cutout 431 and a second cutout 432; wherein the first cutout 431 is interposed between the first arm 421 and the second arm 422; and the second cutout 432 is interposed between the second arm 422 and the third arm 423.

Figure 10:
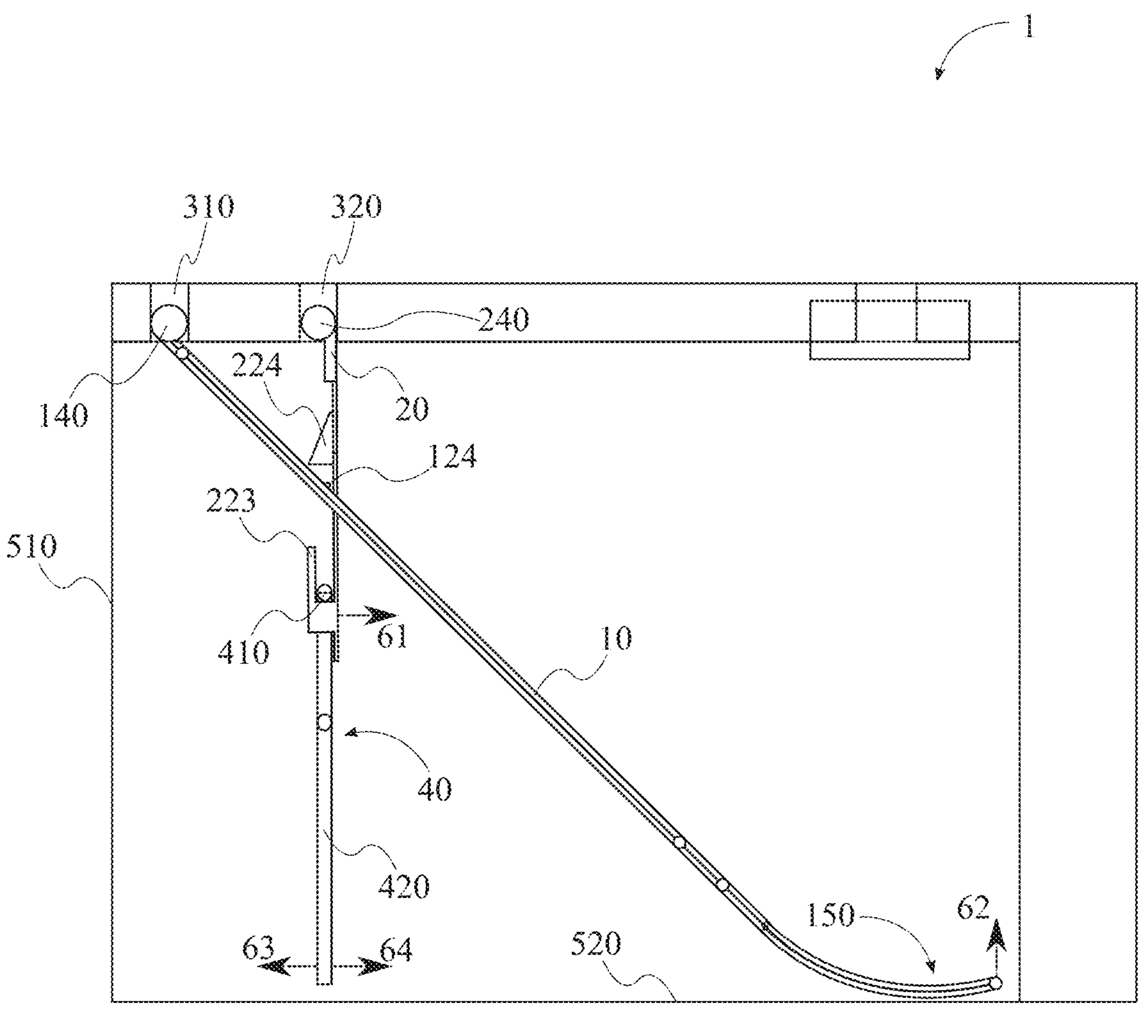
FIG. 10 is a diagram of the present invention.

Referring to FIGS. 8, 9, and 10, in the preferred embodiment of the present invention, in a closed configuration, the pivot pin 140 of the first gate 10 is coupled to the first pair of pivot joint 310, such that the plurality of arms 120 of the first gate 10 extend inwardly at a 35° angle descending downward from the pivot pin 140, such that the distal end 150 at the first gate 10 rests of the bottom-most plane of the present invention, when in the closed configuration. In the context of the present invention, the first gate 10 descends at an inward angle less than perpendicular (90°) from horizontal. Furthermore, the pivot pin 240 of the second gate 20, coupled to the second pair of pivot joints 320, is offset behind the first pair of pivot joints 310. In the preferred embodiment of the present invention, the second gate 20, in the closed configuration, hangs vertically, such that the plurality of arms 220 of the second gate 20 align with the plurality of cutouts 130 of the first gate 10, and the body 210 of the second gate 20 engages with the stopping mechanism 124 of the first gate 10. In the context of the present invention, specifically in the context of the second gate 20 hanging "vertically," the phrasing "vertically" is not limited to a perpendicular angle, but rather, a downward angle such that in some embodiments of the present invention, the second gate 20 is configured to make contact with the bottom plane of the invention. Given the engagement of the second gate 20 with the stopping mechanism 124 of the first gate 10, an upward force 62 applied to the first gate 10 is inhibited, thus preventing the gate mechanism 1 from opening. In such embodiments wherein the second gate 20 comprises a stopping mechanism 224, the stopping mechanism 224 of the second gate 20 engages the stopping mechanism 124 of the first gate 10, thereby prohibiting movement of the first gate 10 until the respective stopping mechanisms 124,224 have been disengaged. To open the gate mechanism 1, an inward force applied 61 to the second gate 20, thereby disengaging the second gate 20 from the stopping mechanism 124 of the first gate 10, thus enables the first gate 10 to hinge upwardly upon a simultaneous inward force 61 applied to the first gate 10. In embodiments, wherein the gate mechanism 1 comprises a third gate 40, an outward force 63 applied to the third gate 40, permits free rotation of the third gate 40 about the pivot axis 410 of the third gate 40 relative to the plurality of hooks 223 of the second gate 20. Contrarily, an inward force 64 applied to the third gate 40 will transfer said inward force 64 to the second gate 20, thereby disengaging the second gate 20 from the stopping mechanism 124 of the first gate 10. In the context of the present invention, the construction and configuration of the first gate 10, prevents said first gate 10 from pivoting or hinging outwardly. In the context of the present invention, through examination of animal behavior, it has been found that animals that are hesitant to initially enter through the gate mechanism 1, are more likely to enter completely through (i.e. pass through the first gate 10 entirely) if they are able to back out from the gate mechanism 1 at some point prior to fully passing through the gate mechanism 1. In other words, the third gate 40 being able to open outwardly, has been found to provide animals with a sense of security.

As the present invention is intended to be used in combination with a live animal trap, the gate mechanism 1 is composed of a material that is resistant to animal manipulation such as clawing or biting through the material. Examples of such materials include polymers, wire mesh, and similar materials. Furthermore, in some embodiments of the present invention, structural supports extending between adjacent arms maybe included as such structural supports increase the integrity of the arm.

Although the invention has been explained in relation to its preferred embodiment, it is to be understood that many other possible modifications and variations can be made without departing from the spirit and scope of the invention.

What is claimed is:

1. A gate mechanism comprising:
a first gate; and
a second gate;
wherein:
the first gate comprises:
a plurality of arms;
a pivot pin; and
a plurality of cutouts;
the second gate comprises:
a plurality of arms;
a pivot pin; and
a cutout;
the plurality of cutouts of the first gate are interposed between the plurality of arms of the first gate;
the plurality of arms of the first gate extend downward and rearward from the pivot pin of the first gate at an angle less than perpendicular relative to a horizontal plane;
the cutout of the second gate is interposed between the plurality of arms of the second gate;
the plurality of arms of the second gate extending vertically downward from the pivot pin of the second gate while in a closed configuration;
the pivot pin of the second gate and the pivot pin of the first gate being maintained in horizontal alignment such that the pivot pin of the second gate is offset behind the pivot pin of the first gate;
the first gate and the second gate are aligned such that the plurality of arms of the first gate is extending between and outside of the plurality of arms of the second gate in an alternating pattern, while in the closed configuration;
the plurality of arms of the second gate freely hanging within the plurality of cutouts of the first gate such that a portion of the second gate extends in front of a portion of the first gate in the closed configuration;
one of the plurality of arms of the first gate comprising a stopping mechanism wherein said stopping mechanism extends a length less than a width of the cutout of the second gate on the one of the plurality of arms of the first gate; and
the second gate engaging with the stopping mechanism of the first gate such that the stopping mechanism of the first gate inhibits an upward force from opening the first gate while the second gate is engaged with the stopping mechanism.

2. The gate mechanism, as claimed in claim 1, wherein the first gate hinges about the pivot pin of the first gate.

3. The gate mechanism, as claimed in claim 2, wherein the second gate hinges about the pivot pin of the second gate.

4. The gate mechanism, as claimed in claim 3, wherein the first gate descends inwardly at the angle less than perpendicular relative to a horizontal plane, and the second gate hangs vertically, while in the closed configuration.

5. The gate mechanism as claimed in claim 4, wherein each of the pivot pin of the first gate and the pivot pin of the second gate hingedly rotates within a pair of pivot joints, such each pivot joint of the pair of pivot joints constrains vertical and horizontal movement of the respective pivot pin.

6. The gate mechanism as claimed in claim 5, wherein the pivot pin of the first gate rotates within a first pivot joint of the pair of pivot joints and the pivot pin of the second gate rotates within a second pivot joint of the pair of pivot joints.

7. The gate mechanism as claimed in claim 1, wherein an inward force applied to the portion of the second gate extending in front of the first gate disengages the second gate from the stopping mechanism thereby enabling the first gate to open.

8. The gate mechanism, as claimed in claim 1, wherein:
the plurality of arms of the first gate comprises:
a first arm;
a second arm; and
a third arm;
the plurality of cutouts of the first gate comprises:
a first cutout; and
a second cutout;
wherein:
the first cutout is interposed between the first arm and the second arm;
the second cutout is interposed between the second arm and the third arm; and
the stopping mechanism is positioned on the second arm.

9. The gate mechanism, as claimed in claim 8, wherein:
the plurality of the arms of the second gate comprises:
a first arm; and
a second arm;
wherein:
the cutout of the second gate is interposed between the first arm and the second arm of the second gate;
the first arm and the second arm of the second gate fall within the first cutout and the second cutout of the first gate.

10. A gate mechanism comprising:

a first gate; and a second gate;

wherein:

the first gate comprises:

a plurality of arms;

a first stopping mechanism;

a pivot pin; and a plurality of cutouts such that the plurality of cutouts are interposed between the plurality of arms;

the second gate comprises:

a plurality of arms;

a second stopping mechanism;

a body;

a pivot pin; and a cutout;

such that:

the plurality of arms of the second gate extends from the body of the second gate;

the cutout of the second gate is interposed between the plurality of arms of the second gate; and the second stopping mechanism of the second gate is positioned on the body of the second gate, adjacent to the cutout of the second gate;

the plurality of cutouts of the first gate are interposed between the plurality of arms of the first gate;

the plurality of arms of the first gate extend downward and rearward from the pivot pin of the first gate at an angle less than perpendicular relative to a horizontal plane;

the cutout of the second gate is interposed between the plurality of arms of the second gate;

the plurality of arms of the second gate extending vertically downward from the pivot pin of the second gate while in a closed configuration;

the pivot pin of the second gate and the pivot pin of the first gate being maintained in horizontal alignment such that the pivot pin of the second gate is offset behind the pivot pin of the first gate;

the first gate and the second gate are aligned such that the plurality of arms of the first gate is extending between and outside of the plurality of arms of the second gate in an alternating pattern, while in the closed configuration;

the plurality of arms of the second gate freely hanging within the plurality of cutouts of the first gate such that a lower portion of the second gate extends in front of a lower portion of the first gate in the closed configuration;

one of the plurality of arms of the first gate comprising the first stopping mechanism wherein said first stopping mechanism extends a length less than a width of the cutout of the second gate on the one of the plurality of arms of the first gate; and the second stopping mechanism of the second gate engaging with the first stopping mechanism of the first gate such that the engagement of the first stopping mechanism and the second stopping mechanism inhibit an upward force from opening the first gate while said first stopping mechanism and second stopping mechanism stopping mechanisms are engaged.

11. The gate mechanism, as claimed in claim 10, further comprising:

a plurality of pivot joints comprising a first pair of pivot joints and a second pair of pivot joints;

the pivot pin of the first gate hingedly rotating within the first pair of pivot joints; and the pivot pin of the second gate hingedly rotating within the second pair of pivot joints.

12. The mechanism, as claimed in claim 11, wherein:

the plurality of arms of the first gate comprises:

a first arm;

a second arm; and a third arm the plurality of cutouts of the first gate comprises:

a first cutout; and a second cutout;

the plurality of arms of the second gate comprising:

a first arm; and a second arm;

wherein:

the first cutout is interposed between the first arm and the second arm of the first gate;

the second cutout is interposed between the second arm and the third arm of the first gate;

the stopping mechanism of the first gate is positioned on the second arm; and the cutout of the second gate is interposed between the first arm and the second arm of the second gate.

13. The gate mechanism, as claimed in claim 12, wherein:

the first gate descends inwardly at said angle less than perpendicular relative to a horizontal plane.

14. The gate mechanism, as claimed in claim 13, wherein an inward force applied to the plurality of arms of the second gate disengages the first stopping mechanism and the second stopping mechanism of the first gate and second gate, respectively, allowing the gate mechanism to open.

* * * * *